United States Patent [19]

Vecchiotti et al.

[11] 4,002,417
[45] Jan. 11, 1977

[54] APPARATUS FOR FOLDING A SHEET OF PLASTIC MATERIAL

[75] Inventors: Camillo M. Vecchiotti, Ridgewood; Bruce S. Goldberg, Clifton, both of N.J.

[73] Assignee: Amerace Corporation, New York, N.Y.

[22] Filed: Dec. 23, 1974

[21] Appl. No.: 535,980

[52] U.S. Cl. .............................. 425/385; 264/296; 264/339; 270/83; 425/398
[51] Int. Cl.² ........................................ B29C 17/02
[58] Field of Search .......... 425/162, 167, 394, 403, 425/409, 385, 398; 72/385, 386, 389; 264/295, 296, 320, 322, 339, 292; 270/83

[56] References Cited

UNITED STATES PATENTS

| | | | |
|---|---|---|---|
| 2,420,119 | 5/1947 | Boehm et al. | 425/394 X |
| 3,115,678 | 12/1963 | Keen et al. | 425/343 |
| 3,466,919 | 9/1969 | Bledstein | 72/389 |
| 3,668,033 | 6/1972 | Evans | 425/385 |
| 3,816,044 | 2/1973 | Nielsen et al. | 425/385 |

OTHER PUBLICATIONS

Taber Instrument Corporation, Taber Thermofold, Aug. 4, 1950.

*Primary Examiner*—Richard B. Lazarus
*Assistant Examiner*—Carl Rowold
*Attorney, Agent, or Firm*—S. Michael Bender

[57] ABSTRACT

An apparatus for folding a sheet of relatively brittle material in which an articulated frame assembly is mounted relative to a support structure in a manner so that two portions of the frame assembly can pivot relative to each other in an angular direction to fold the sheet about a fold line intermediate the ends of the sheet. Each portion of the frame assembly includes a movable portion which is adapted to fold the outer end portion of the sheet about an additional fold line intermediate the first fold lines and the outer edge portion. The sheet is heated along the fold lines prior to the folding operations.

15 Claims, 9 Drawing Figures

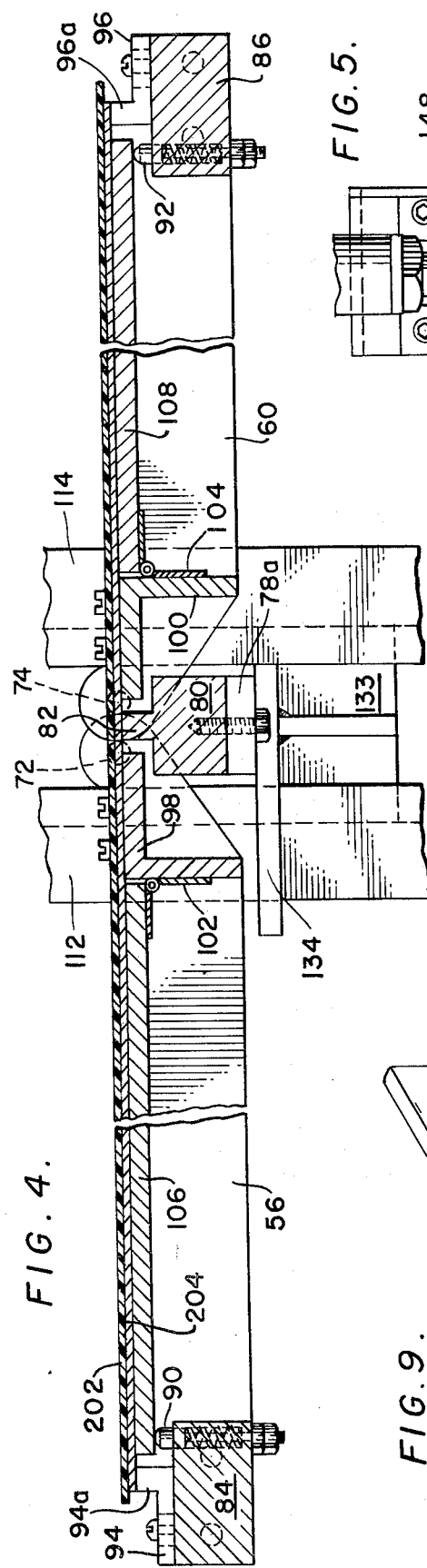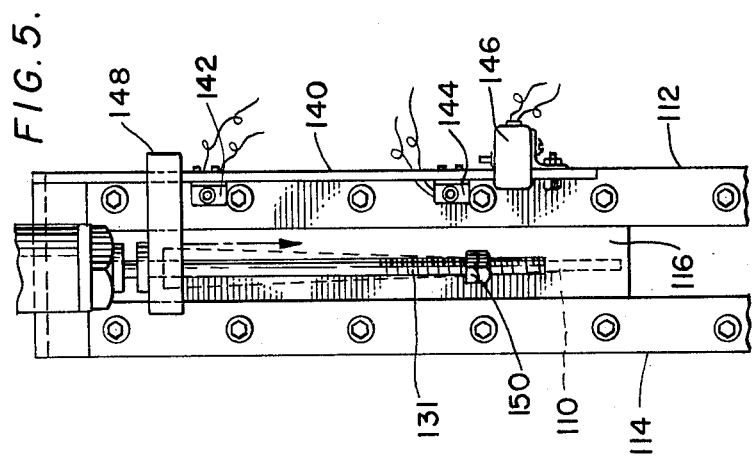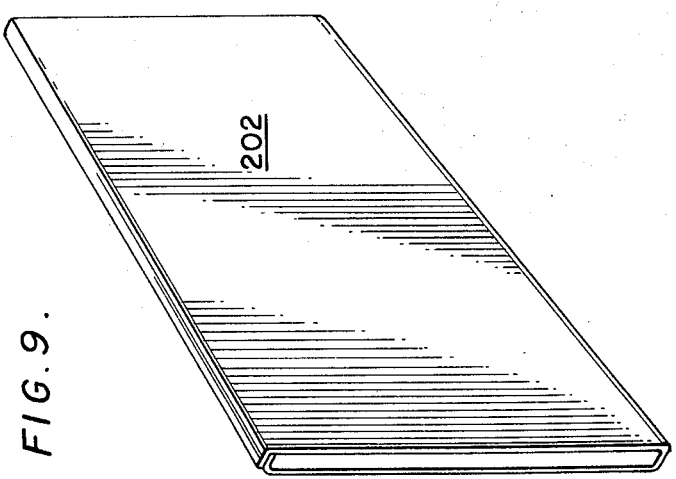

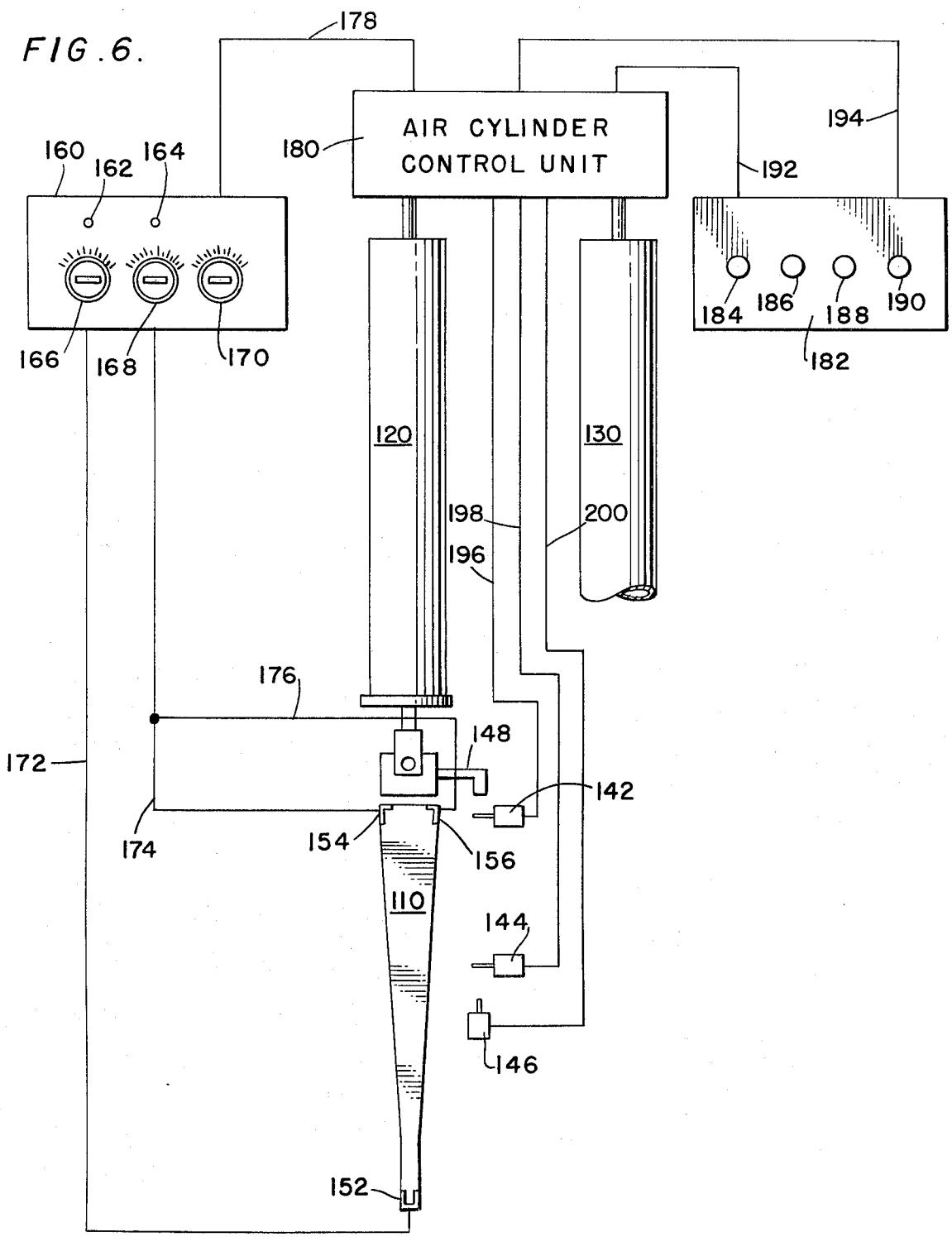

FIG. 7.
FIG. 8.
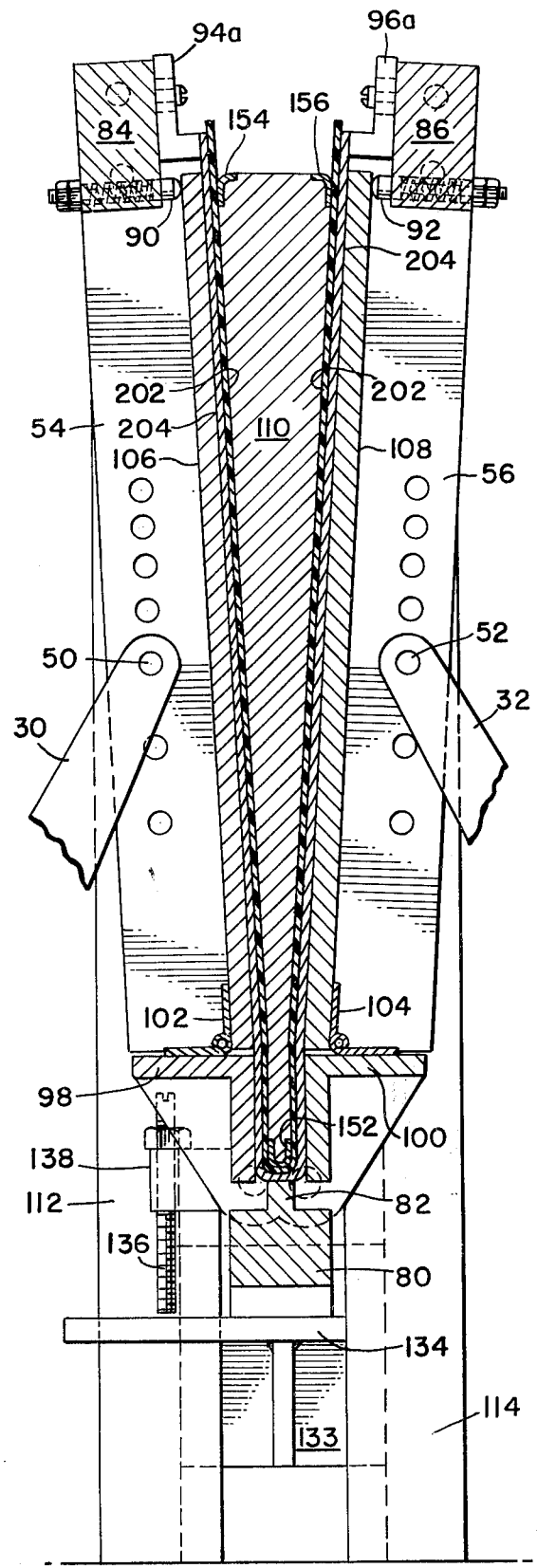
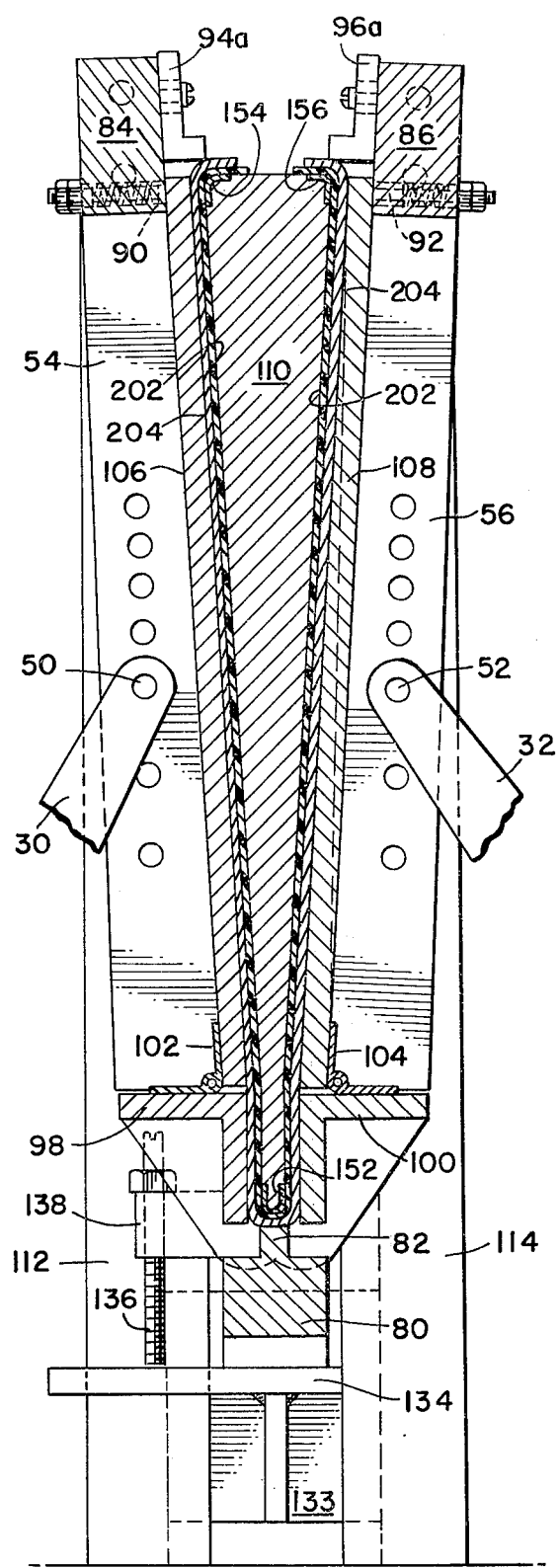

APPARATUS FOR FOLDING A SHEET OF PLASTIC MATERIAL

BACKGROUND OF THE INVENTION

This invention relates to an apparatus and method for forming an envelope from a sheet of a relatively brittle material and, more particularly, to such an apparatus and method for forming such an envelope for use as a battery separator.

Traditionally, wet cell batteries employ at least one pair of opposite polarity planar electrodes, normally referred to as plates, which are closely spaced in a parallel relationship and immersed in a liquid electrolyte to form an electrochemical couple. A great majority of these type batteries employ a plurality of the opposite polarity plates with the plates being normally arranged in an upstanding face-to-face relation, and with the exact number of pairs in a particular battery depending upon the capacity and/or voltage desired.

To avoid adjacent opposite polarity plates from coming into direct physical contact and thereby causing arcing and/or short circuiting, it is necessary to electrically insulate the adjacent plates from each other. To achieve this insulation, electrically insulative material, usually in the form of sheets similar in size to the electrode plates, and commonly referred to as separators, have been positioned between the opposite polarity plates, with the insulative material being permeable or semipermeable to the liquid electrolyte to sustain the ionic conduction required for the battery action. In older designs, the separators were formed of rubber, wood, and glass while more recent designs have used plastic materials.

Although these types of separators were adequate in many applications, some deficiencies in their insulating capability did develop, especially in connection with relatively heavy-duty industrial-type batteries such as traction batteries, etc. In particular, it has been discovered that, by reason of the close proximity of the exposed side edges of the adjacent plates, dendrites form on and project out from the edge portion of one or the other of the plates, especially after the battery had been in use for a relatively long period of time. These dendrites cause short-circuiting and/or arcing between the adjacent plates which, of course, reduces the capacity and/or output voltage of the battery.

In order to overcome this problem, recent battery designs have included an open ended envelope-type separator of an insulating material which covers the side edge portions of the plates and prevents the above-mentioned short circuiting and arcing.

In a parallel sense, the state of the art has also developed with respect to the materials used for the separators. In particular, recent designs have formed separators of a microporous plastic material, including polyethylene, vinyl resin, and the like, which has excellent insulating capability yet is relatively low in weight and cost. An example of this type of separator is disclosed in U.S. Pat. No. 3,696,061, issued Oct. 3, 1972 in the name of Selsor et al., the disclosure of which is hereby incorporated by reference. The Selsor et al. patent is assigned to the same assignee as the present application. And although battery separators of the type disclosed in the aforementioned Selsor et al. patent have found widespread commercial acceptance, these separators suffer from the disadvantages of being relatively brittle and consequently, heretofore have been incapable of being folded into the desired envelope configuration on a high production, relatively inexpensive basis.

SUMMARY OF THE INVENTION

It is, therefore, an object of the present invention to provide an apparatus and method for forming a relatively brittle plastic sheet into an envelope.

It is a more particular object of the present invention to provide an apparatus and method for forming an envelope by folding a plastic sheet about an intermediate fold line and then about two additional fold lines while selectively heating the sheet along localized regions thereof defined essentially by the fold lines to prevent cracking of the sheet.

It is a further object of the present invention to provide an apparatus and method which forms an envelope of the above type suitable for use as a battery separator.

Toward the fulfillment of these and other objects, the apparatus of the present invention comprises an articulated support assembly for supporting the sheet of material, the assembly comprising two portions adapted for pivotal movement relative to each other to fold the sheet about a fold line intermediate the ends of the sheet, each portion including two members adapted for relative movement for folding the sheet about two additional fold lines each intermediate the first fold line and the end portions of the sheet, and means for selectively heating the sheet material along localized regions thereof defined essentially by the fold lines in a sequence corresponding to the folding operations.

BRIEF DESCRIPTION OF THE DRAWINGS

FIG. 4 is a partial sectional view taken along the line 4—4 of FIG. 3;

FIG. 5 is a partial rear elevational view of the apparatus of FIGS. 1–4;

FIG. 6 is a schematic diagram of the control system of the apparatus of the present invention;

FIGS. 7 and 8 are sectional views of a portion of the apparatus of the present invention showing two different operational modes; and FIG. 9 is a perspective view of the article manufactured according to the apparatus and method of the present invention.

DESCRIPTION OF THE PREFERRED EMBODIMENTS

Figure 1:
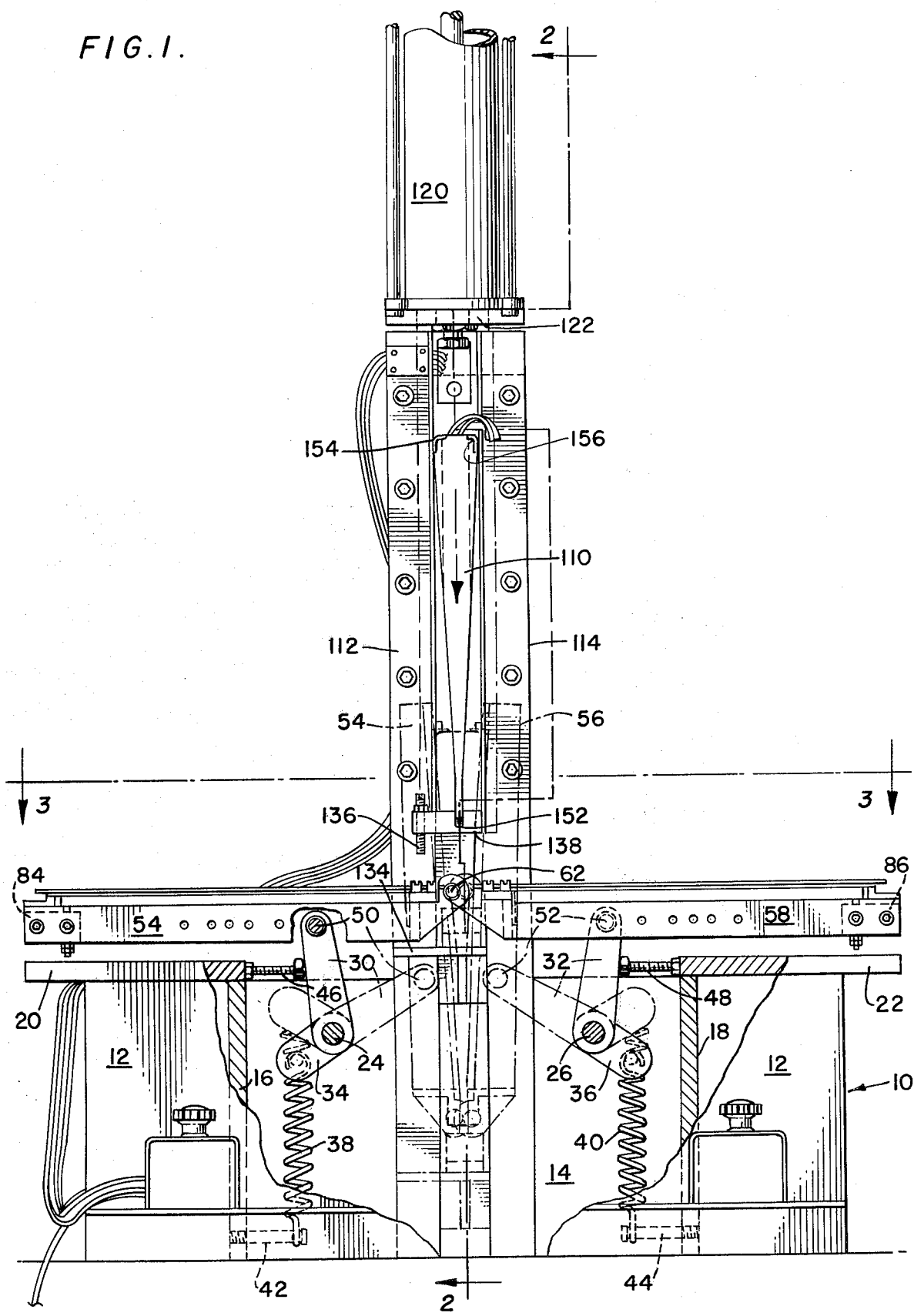
FIG. 1 is a front elevational view, partially in section, depicting the apparatus of the present invention.
Figure 2:
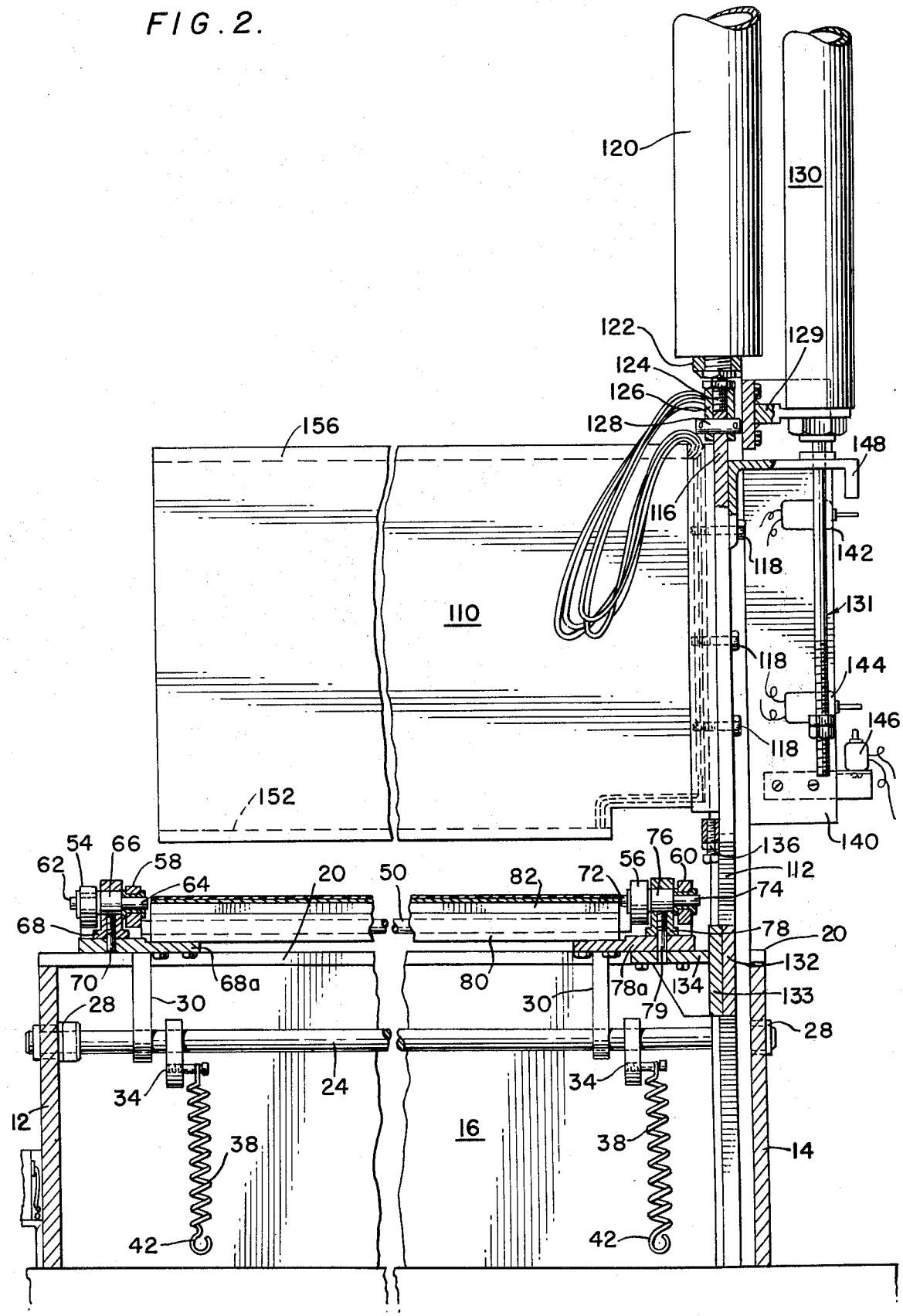
FIGS. 2 and 3 are sectional views taken along the lines 2—2 and 3—3, respectively, of FIG. 1.
Figure 3:
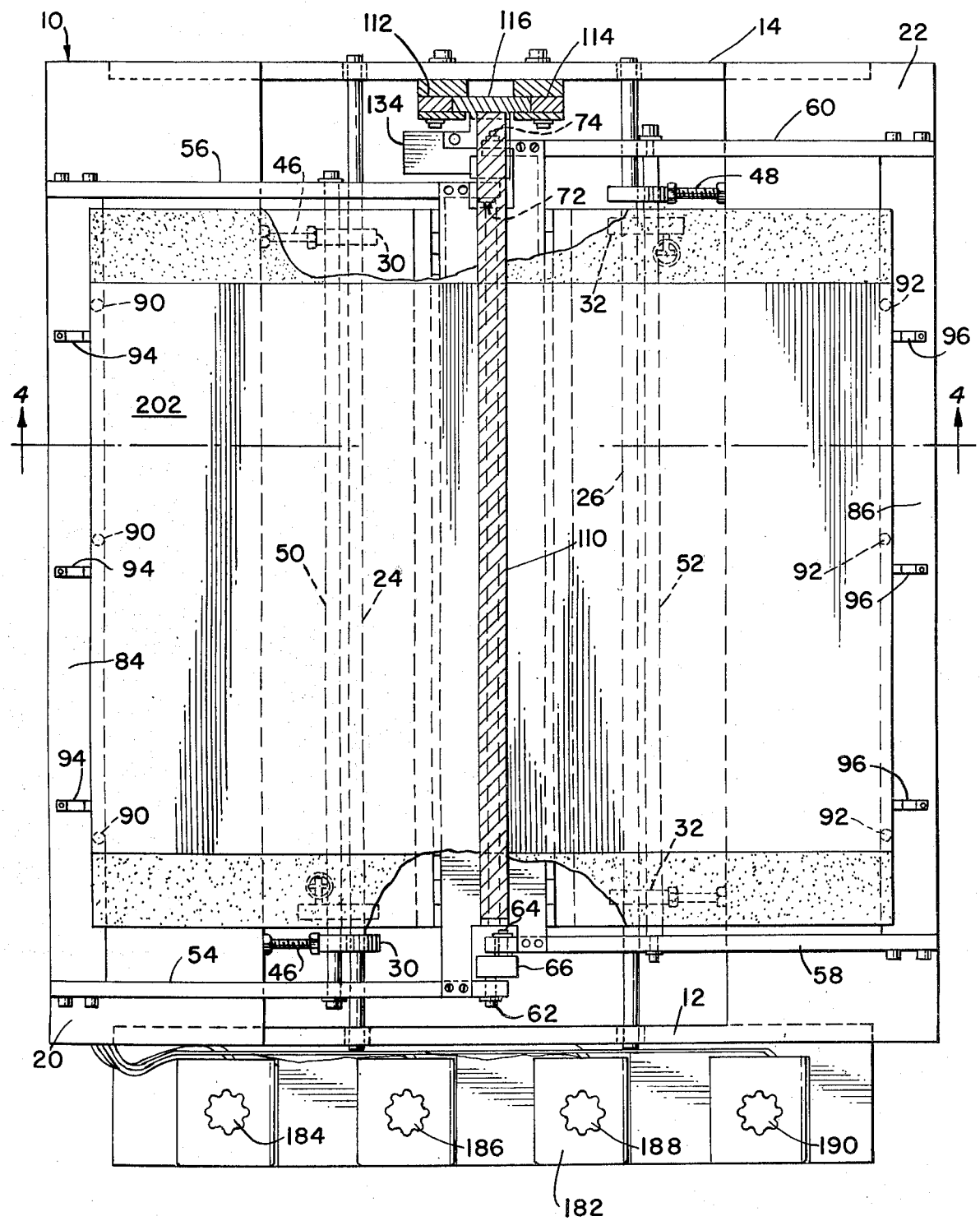

Referring to FIGS. 1–3 of the drawings, the reference numeral 10 refers in general to a support table or frame formed by front and rear plates 12 and 14, respectively, and a pair of side plates 16 and 18 connected to the front and rear plates and spaced inwardly from the outer edge portions of the latter plates. A pair of horizontal plates 20 and 22 are supported in a spaced relationship on the upper edges of the plates 12, 14, 16, and 18.

A pair of spaced parallel rods 24 and 26 extend between the plates 12 and 14 inwardly from the plates 16 and 18, and are journalled in bearings 28 extending through the plates 12 and 14, as better shown in FIG. 2, to permit rotation of the rods relative to the plates.

As shown in FIGS. 1 and 2, two pairs of spaced crank levers 30 and 32 are fixedly secured to the rods 24 and 26, respectively, and extend in a generally upward direction from the rods. Two additional pairs of levers 34 and 36 are also fixed to the rods 24 and 26, respectively, and extend in a generally downward direction from the rods. The levers 34 and 36 are spaced slightly from their corresponding levers 30 and 32 and are attached at their free ends to the ends of two pairs of springs 38 and 40, respectively. Two pairs of pins 42 and 44 extend from the plates 16 and 18 of the table 10, and are fixed to the other ends of the springs 38 and 40, respectively. As a result, the levers 30 and 32 are urged to the positions shown by the solid lines in FIG. 1 for reasons that will be explained in detail later. Two pairs of bolts 46 and 48 may be threadedly mounted relative to the plates 20 and 22 as shown in FIG. 1 in order to limit the movement of the crank levers 30 and 32, respectively, in this direction.

As better seen in FIGS. 1 and 3, a pair of spaced parallel rods 50 and 52 extend through corresponding openings formed in the levers 30 and 32, respectively, with the rod 50 being journalled at its respective ends within a pair of spaced parallel arms 54 and 56 which normally extend in a horizontal direction, and the rod 52 being journalled at its respective ends within a similar pair of arms 58 and 60.

As shown in FIGS. 2 and 3, the arms 54 and 58 are pivoted at their ends over a pair of eccentric shafts 62 and 64, respectively, extending from opposite faces of a disc 66 which, in turn, is fixedly secured within a support assembly 68, by means of a set screw 70 and extending through a base plate 68a of the support assembly and engaging the disc 66. In a similar manner, the arms 56 and 60 are pivoted at their ends over a pair of eccentric shafts 72 and 74, respectively, extending from a disc 76 which, in turn, is fixedly secured with a support assembly 78 by means of a set screw 79 extending through a base plate 78a of the support assembly and engaging the disc 76.

An elongated anvil member 80 extends between the base plates 68a and 78a and is bolted at its end portions to the latter plates. As better shown in FIG. 4, the anvil member 80 includes a flange portion 82 extending from its upper surface and along its entire length for reasons that will be explained in detail later.

Referring to FIGS. 3 and 4, a bar 84 extends between the arms 54 and 56 and is bolted at its ends to the free ends of the latter arms, and a bar 86 is bolted at its ends to the other ends of the arms 58 and 60. Three spring loaded pins 90 are mounted at spaced intervals in openings formed in the upper surface of the bar 84 and three spring loaded pins 92 are mounted in a similar manner in the bar 86. Each of the spring loaded pins 90 and 92 is urged by its spring to a position where an end portion projects a relatively small distance outwardly from the corresponding surfaces of the bars 84 and 86, respectively. Three L-shaped fold bars 94 are mounted to the upper surface of the bar 84, and three fold bars 96 are mounted to the upper surface of the bar 86. The fold bars 94 and 96 have upstanding leg portions 94a and 96a, respectively, for reasons that will be explained later.

As shown in FIG. 4, an angle iron support bar 98 is mounted at its ends to the arms 54 and 56 and extends in a spaced parallel relation to the bar 84, while a support bar 100 is mounted in a similar manner to the arms 58 and 60 and in a spaced parallel relation to the bar 86. One leg portion of each of a pair of elongated hinge assemblies 102 and 104 is mounted to the support bars 98 and 100, respectively, with the other leg portion of each hinge assembly defining a horizontal support surface.

A fold plate 106 extends between the bar 84 and the bar 98 and is supported along its end portions by the pins 90 and by the hinge assembly 102, respectively. In a similar manner, a fold plate 108 extends between the bar 86 and the bar 100 and is supported by the pins 92 and the hinge assembly 104.

A mandrel, or forming blade, 110 fabricated from a heat-resistant, non-conductive material such as for example, laminated phenolic sheet, is supported above the support table 10 by means of a guide assembly shown better with reference to FIGS. 1–3. The guide assembly includes a pair of vertically extending guide rails 112 and 114 which are bolted to the inner surface of the rear plate 14 of the support table 10. Each of the guide rails 112 and 114 comprises three plates bolted together with an inner plate having a reduced width to define a groove for receiving a slide plate 116. A plurality of bolts 118 attach the slide plate 116 to the rear face of the forming blade 110 for supporting the blade in the position shown in FIG. 2.

A pneumatically operated cylinder 120 is supported by a bracket 122 located at the top of the guide rails 112 and 114. The cylinder 120 has a threaded piston rod 124 which is secured in a threaded opening formed in one end portion of a mounting block 126. A notch is formed in the other end portion of the block 126 and receives the upper end portion of the slide plate 116. A pin 128 extends through corresponding openings formed in the mounting block 126 and the slide plate 116 to fix the slide plate relative to the rod 124. Air is selectively admitted and discharged from the cylinder 120 in a manner to be described later to reciprocally drive the piston rod 124, and therefore the slide plate 116 and the forming blade 110, in a generally upwardly and downwardly direction as viewed in FIG. 2.

A support bracket 129 is secured to the rear of the guide rails 112 and 114 and supports an additional pneumatically operated cylinder 130 having a piston rod 131. Air is also selectively admitted to and discharged from the cylinder 120 to reciprocate the rod 131 for reasons to be described in detail later.

An additional slide plate 132 is slidably disposed in the groove defined between the guide rails 112 and 114 below the slide plate 116. A vertical plate 133 is attached to the slide plate 130, extends out of the above-mentioned groove, and is connected to a horizontal plate 134 which, in turn, is bolted to the base plate 78a of the support assembly 78, with the set screw 79 of the latter assembly also extending through the plate 134.

As better seen in FIGS. 1 and 2, a threaded rod 136 extends through a threaded opening in a plate 138 affixed to the lower portion of slide plate 116, and is adapted to engage the plate 134, for reasons that will be explained in detail later.

As shown in FIGS. 2 and 5, a vertically extending plate 140 is mounted to the rear of guide rail 112 and supports three vertically spaced limit switches 142, 144, and 146, which are sequentially engaged by a blade 148 attached to the rear of the slide plate 116 during downward movement of the latter plate. The limit switches 142, 144, and 146 operate to sequentially stop the movement of the slide plate 116, and therefore the forming blade 110, in a manner to be described in detail later.

The piston rod 131 extends through an opening in the blade 148 and receives a nut 150 which is engaged by the blade at its lowermost position. As a result, upward movement of the rod 131 by the cylinder 130 will also move the blade 148, and therefore the slide plate 116 and the forming blade 110, in the same direction.

As shown in FIG. 1, a heating element 152, preferably of the electrical impulse type, is mounted on the folding blade 110 along its lower edge portion, and a pair of similar heating elements 154 and 156 are mounted on the blade along its upper corners, with the heating elements functioning in a manner to be described in detail later.

The control system for operating the heating elements 152, 154, and 156 on the forming blade 110 and the pneumatic cylinders 120 and 130 is shown schematically in connection with FIG. 6. In particular, a control console 160 is provided which has two actuation buttons 162 and 164 associated with three timer switches 166, 168 and 170. The timer switch 166 is electrically connected, by a conductor 172, to the heating element 152, while the timer switch 168 is electrically connected by conductors 174 and 176 to the heating elements 154 and 156, respectively. The timer switch 170 is connected, via a conductor 178, to an air cylinder control unit 180 which operates in a conventional manner to control the intake and output of air to and from the cylinders 120 and 130, respectively, and thus reciprocally drive their respective piston rods 124 and 131. In this connection, an additional control console 182 is provided having four actuation buttons 184, 186, 188, and 190 which are connected, via lines 192 and 194, to the air cylinder control unit 180 to operate the cylinders 120 and 130 in the specific manner to be described later.

The limit switches 142, 144, and 146 are also electrically connected to the air cylinder control unit 180 by the lines 196, 198 and 200, respectively, to also control the operation of the cylinders 120 and 130.

It will be appreciated that the aforementioned electrical connections are part of electrical circuits that are not shown in their entirety in the interest of brevity, and that such circuits would include various components, such as resistors, relays, etc., as needed to effect the above operations. The details of these control circuits are conventional and form no part of the present invention; suffice it to say, that only those features thereof which are deemed necessary for a complete understanding of the present invention are described herein.

The operation of the apparatus of the present invention will be described in connection with the folding of a workpiece 202 of relatively brittle plastic material of the type disclosed, for example, in the above-identified Selsor et al. patent to form the envelope shown in FIG. 9. The workpiece 202 which initially is in the form of a relatively thin, substantially flat sheet is placed over the fold plates 106 and 108, which are in their normal horizontal position as shown in FIG. 4, with a piece of relatively soft resilient backing material 204 such as, for example, a mat of a silicone sponge rubber, extending between the workpiece and the fold plates. It is noted that the ends of the material 204 extend flush with the projecting leg portions 94a and 96a, respectively, of the fold bars 94 and 96, and the ends of the workpiece 202 extend slightly outwardly from or beyond the ends of the material 204.

To commence the operation, an operator presses button 184 which, through the air cylinder control unit 180, introduces air into the cylinder 120 causing its piston rod 124, and therefore the slide plate 116 and the forming blade 110, to move from the position shown in FIG. 2 downwardly to a position where the rod 136 engages the plate 134, and the lower edge portion of the forming blade engages in an abutting manner the workpiece 202 along a line halfway between its two ends and urges this portion of the workpiece against the flange 82 of the anvil 80. During this downward movement, the end portion of the blade 148 operatively engages the limit switch 142 which, through the air cylinder control unit 180, terminates the operation of the air cylinder 120 and therefore stops movement of the piston rod 124 and the forming blade 110 in the latter position.

The operator then pushes the button 162 which actuates the heating element 152 and the timer switch 166. The heating element 152 is thus energized for a predetermined time to apply heat to and thereby softening that localized region or portion of the workpiece 202 with which it is in contact, after which predetermined time the heating element is deenergized by the timer switch 166. The operator then pushes button 186 which causes the air cylinder 120 to move the forming blade 110 further downwardly against the resistance provided by the anvil 80 by virtue of the upwardly directed force applied against the anvil by the springs 38 and 40 acting through the levers 32, 34, 35, 38, the rods 54, 56, 58, and 60 and the support assemblies 68 and 78. This movement through the action of the support assemblies 68 and 78, the arms 54, 56, 58 and 60, and the levers 30 and 32, results in a pivoting movement of the arms 54 and 56 about the rod 50, as well as a pivoting movement of the arms 58 and 60 about the rod 52 along with movement of the arms 58 and 60 about the rod 52 along with movement of the rods 50 and 52. During this movement, the blade 148 engages the limit switch 144, which, through the control unit 180, stops further movement of the forming blade 110 the arms 54, 56, 58 and 60 attain a substantially vertical position as shown in FIG. 7 and by the dashed line in FIG. 1. The workpiece 202 is thus folded about a fold line extending along and within the localized region of the workpiece which had been softened by the heat generated by heater element 152. It is noted that, in the position of FIG. 7, the fold blades 106 and 108 urge the upper surfaces of the respective corresponding portions of the workpiece 202 against the side faces of the forming blade 110.

The operator then presses button 164 which activates the heater elements 154 and 156 on the upper edge portions of the folding blade 110, as well as the timer switches 168 and 170. The heat generated by heater elements 154 and 156 thus softens the workpiece 202 along localized regions spaced slightly inwardly from the ends of the workpiece and are deactivated after a predetermined time interval by the timer switch 168. The timer switch 170 controls the operation of the air cylinder control unit in a manner to be described later.

After the heating elements 154 and 156 have been deactivated by the timer switch 168, the operator then presses button 188 which, through the air cylinder control unit 180, causes the air cylinder 120 to move the forming blade 110 further downwardly a relatively short distance until the blade 148 engages the limit-switch 146 to terminate further movement. This movement causes movement of the rods 54 and 56 and therefore the bar 84 inwardly towards the forming blade 110 and a similar movement of the rods 58 and 60 and therefore the bar 86, which, in turn, compresses the spring loaded buttons 90 and 92. This, in turn, causes the projecting portions 94a and 96a of the fold bars 94 and 96, respectively, to urge the end portions of the material 204 and therefore the workpiece 202, outwardly and downwardly as shown in FIG. 8 to fold them. The timer switch 170, which had been actuated in a previous step as discussed above, functions, through the control unit 180, to maintain the assembly in the position shown in FIG. 8 a predetermined time, to permit the workpiece to cool properly. Upon the timer switch 170 turning off, the operator can push button 190 which actuates the air cylinder 130 through the control unit 180, and causes the piston rod 131 to move upwardly with the nut 150 engaging the blade 148 to force the forming blade 110 to its uppermost position, with this movement being assisted by the springs 38 and 40 and limited by the pins 46 and 48 engaging the levers 30 and 32, respectively.

The workpiece can then be removed and its folded end portions overlapped to produce the finished product shown in FIG. 9, which is readily adaptable to receive a battery plate, as discussed above. If desired, the overlapped ends of the envelope may be adhesively secured together utilizing known means, such as adhesives, sonic welding techniques, and so on.

It will further be appreciated that the predetermined time intervals controlled by timer switches 166, 168 and during which the heater elements 152, 154 and 156 are energized will depend upon the thickness of the workpiece material and the composition of this material. The same is true with respect to the predetermined time interval controlled by timer switch 170. Accordingly, these timer switches 166, 168, and 170 should be adjustable over a relatively wide range to enable the apparatus of the present invention to accommodate various thicknesses of various materials. In one exemplary embodiment of the invention, polyvinyl chloride based sheets were folded into the envelope shape of FIG. 9, suitable for use as a battery separator, wherein the sheets had a minimal thickness of about 0.030 inches, the predetermined timing interval of heating elements 152, 154, and 156 was about 1.5 seconds each, and the cooling-off cycle determined by switch 170 was in the range of about 30 to about 60 seconds. The resulting envelopes exhibited no sign of cracking in the localized regions corresponding generally to the fold lines thereof.

Without limiting the present invention, it is thus seen that the apparatus described hereinabove enables a relatively brittle plastic workpiece to be folded along a plurality of fold lines subsequent to being selectively heated in localized regions thereof corresponding generally to said fold lines to prevent possible cracking of the material, all in a precise yet high-speed and economical manner.

It is understood that variations of the apparatus and method disclosed above can be made by those skilled in the art without departing from the invention as defined in the appended claims.

We claim:
1. Apparatus for folding a sheet of brittle material comprising a support frame; support means pivotably mounted with respect to said frame and defining a support surface for at least part of said sheet; means operatively associated with said frame and said support means for pivoting said support means relative to said frame from a first position to a second position to form a fold in said sheet; said support means including a first member adapted to engage a first portion of said at least part of said sheet in said second position of said support means; and a second member movable with respect to said first member, said second member adapted to support a second portion of said at least part of said sheet for movement relative to said first member for folding said sheet to form additional fold therein spaced from said first-mentioned fold in said sheet; and means mounted relative to said support frame for applying heat to said sheet material in the region of said first-mentioned fold and said additional fold in a sequence corresponding to said pivoting of said support means from said first position to said second position, and said movement of said member with respect to said first member, respectively; wherein said support means first position is a substantially horizontal plane relative to said support frame and wherein said support means is adapted to lie in a substantially vertical plane in said second position.

2. The apparatus of claim 1 further comprising means for returning said support means to a substantially horizontal plane after said sheet is folded.

3. The apparatus of claim 2 further comprising means for preventing said return of said support means for a predetermined time after the termination of said heating operations to permit said sheet material to cool.

4. Apparatus for folding a sheet of brittle material comprising a support frame, a support means pivotably mounted with respect to said frame and defining a support surface for at least part of said sheet; means operatively associated with said frame and said support means for pivoting said support means relative to said frame from a first position to a second position to form a fold in said sheet; said support means including a first member adapted to engage a first portion of said at least part of said sheet in said second position of said support means, and a second member movable with respect to said first member, said second member adapted to support a second portion of said at least part of said sheet for movement relative to said first member for folding said sheet to form an additional fold therein spaced from said first-mentioned fold in said sheet; and means mounted relative to said support frame for applying heat to said sheet material in the region of said first-mentioned fold and said additional fold in a sequence corresponding to said pivoting of said support means from said first position to said second position, and said movement of said second member with respect to said first member, respectively; wherein said means for applying heat to said sheet material comprises a forming blade having a first portion for restraining said sheet relative to said support means in the first position thereof, and a second portion for restraining said at least part of said sheet relative to said second member in the said second position of said support means, said forming blade including a first heating element associated with said first portion of said blade for applying heat to said sheet in the region of said first fold, and a second element spaced from said first heating element and associated with said second portion of said blade for applying heat to said sheet in the region of said additional fold.

5. The apparatus of claim 4 including means operable in said second position of said support means for causing relative movement between said first member and said second member.

6. The apparatus of claim 5 including control means for energizing said first heating element before said support means has pivoted with respect to said table from its first position to its second position, and for energizing said second heating element before operation of said means causing relative movement between said first member and said second member.

7. The apparatus of claim 6 wherein said control means further include means for actuating said operable means to cause relative movement between said first member and said second member a predetermined time interval after deenergization of said second heating element.

8. Apparatus for folding a sheet of brittle material comprising a support frame, a support means for at least part of said sheet; means operatively associated with said frame and said support means for pivoting said support means relative to said frame from a first position to a second position to form a fold in said sheet; said support means including a first member adapted to engage a first portion of said at least part of said sheet in said second position of said support means, and a second member movable with respect to said first member, said second member adapted to support a second portion of said at least part of said sheet for movement relative to said first member for folding said sheet to form an additional fold therein spaced from said first-mentioned fold in said sheet; and means mounted relative to said support frame for applying heat to said sheet material in the region of said first-mentioned fold and said additional fold in a sequence corresponding to said pivoting of said support means for said first position to said second position, and said movement of said second member with respect to said first member, respectively; wherein said support means includes a pair of substantially rectangular frame members each having said first and second member, each of said frame members being connected to a shaft mounted on a movable support assembly for pivotal movement relative to said support table between said first position and said second position, the axis of rotation defined by each said shaft being laterally offset with respect to each other, said apparatus further including an anvil member connected to said support assembly and extending between said axes, and means for applying a force against said anvil member to cause movement of said support assembly resulting in pivotal movement of said frame members about said axes respectively from said first position to said second position, said means for applying said force against said anvil comprising a forming blade having a first portion for restraining said sheet relative to said support means in the first position thereof, and a second portion for restraining said at least part of said sheet relative to said second member in the second position of said support means, said forming blade including a first heating element associated with said first portion of said blade for applying heat to said sheet in the region of said first fold, and a second heating element associated with said second portion of said blade for applying heat to said sheet in the region of said additional fold.

9. Apparatus for folding a sheet of brittle material comprising a support frame; support means pivotally mounted with respect to said frame and defining a support surface for at least part of said sheet; means operatively associated with said frame and said support means for pivoting said support means relative to said frame from a first position to a second position to form a fold in said sheet; said support means including a first member adapted to engage a first portion of said at least part of said sheet in said second position of said support means, and a second member movable with respect to said first member, said second member adapted to support a second portion of said at least part of said sheet for movement relative to said first member for folding said sheet to form an additional fold therein spaced from said first-mentioned fold in said sheet; and means mounted relative to said support frame for applying heat to said sheet material in the region of said first-mentioned fold and said additional fold in a sequence corresponding to said pivoting of said support means from said first position to said second position, and said movement of said second member with respect to said first member, respectively; wherein said support means comprises at least one substantially rectangular frame member adapted to pivot about an axis; and wherein said means operatively associated with said frame and said support means includes means for moving said axis relative to said support frame to cause said pivotal movement from said first position to said second position.

10. The apparatus of claim 9 wherein said at least one frame member comprises two spaced parallel arms and a bar connected at each end to end portions of said arms, the other end portions of said arms being pivotal about said axis.

11. The apparatus of claim 10 further comprising an arm support assembly having a support shaft about which said end portions of said arms of said at least one frame member are pivoted, and further comprising an anvil member extending adjacent said support means and being connected to said arm support assembly.

12. The apparatus of claim 11 further comprising means for applying a force against said anvil member to move said arm support assembly and therefore said axis and cause said pivotal movement of said frame member from said first position to said second position.

13. The apparatus of claim 12 wherein said force applying means comprises a forming blade and means to move said forming blade relative to said table, said forming blade having a first portion for restraining said sheet relative to said support means in the first position thereof, and a second portion for restraining said at least part of said sheet relative to said second member in the said second position of said support means, said forming blade including a first heating element associated with said first portion of said blade for applying heat to said sheet in the region of said first fold, and a second heating element associated with said second portion of said blade for applying heat to said sheet in the region of said additional fold.

14. The apparatus of claim 9 wherein said first member includes said frame member said apparatus further comprising at least one resiliently biased movable pin extending from said frame member, and said second member comprising a support plate extending from said frame member and engaging said pin for supporting said second portion of said at least part of said sheet, said support plate being pivotally mounted on said frame member for movement relative to said frame member.

15. The apparatus of claim 14 wherein said means for heating said sheet material comprises a forming blade having a first portion for restraining said sheet relative to said support means in the first position thereof, and a second portion for restraining said at least part of said sheet relative to said support plate extending from said frame member in the said second position of said support means, said forming blade including a first heating element associated with said first portion of said blade for applying heat to said sheet in the region of said first fold, a second heating element associated with said second portion of said blade for applying heat to said sheet in the region of said additional fold, means operable in said second position of said support means for causing relative movement between said frame member and said support plate and control means for energizing said first heating element before said support means has pivoted with respect to said table from its first position to its second position, and for energizing said second heating element before operation of said means causing relative movement between said frame member and said support plate.

* * * * *